Dec. 8, 1970   A. R. BARRINGER ET AL   3,546,574
PROTON PRECESSION MAGNETOMETER WITH SYNCHRONOUS PUMPING
Filed March 2, 1967   2 Sheets-Sheet 1
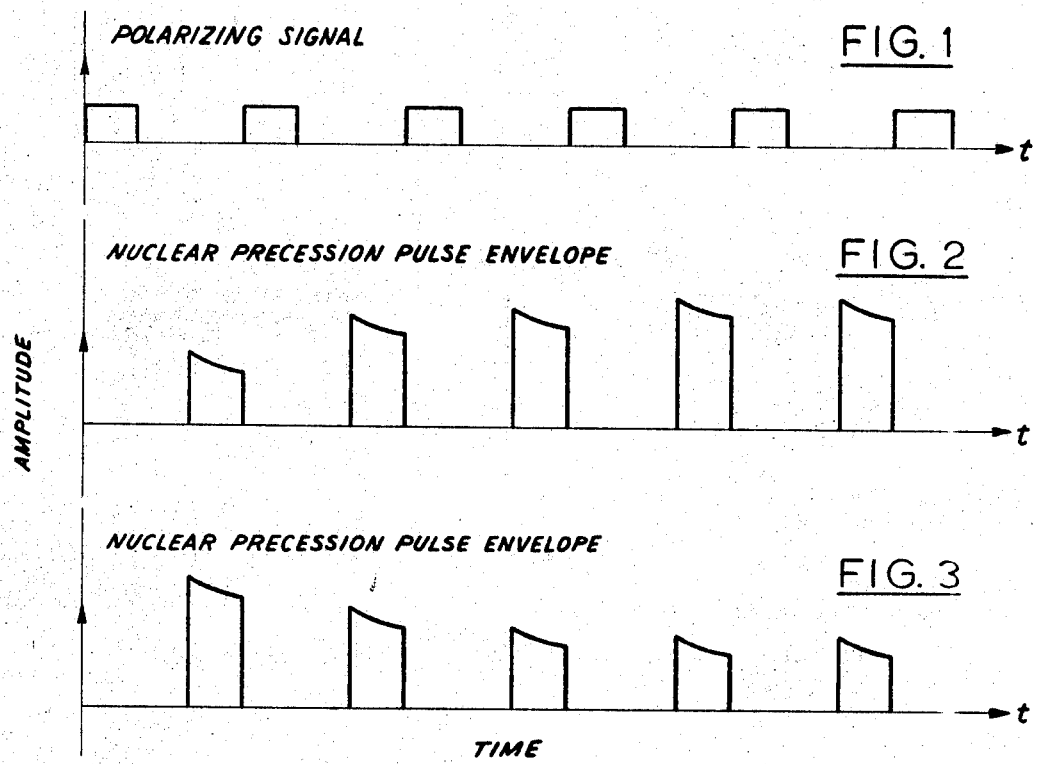
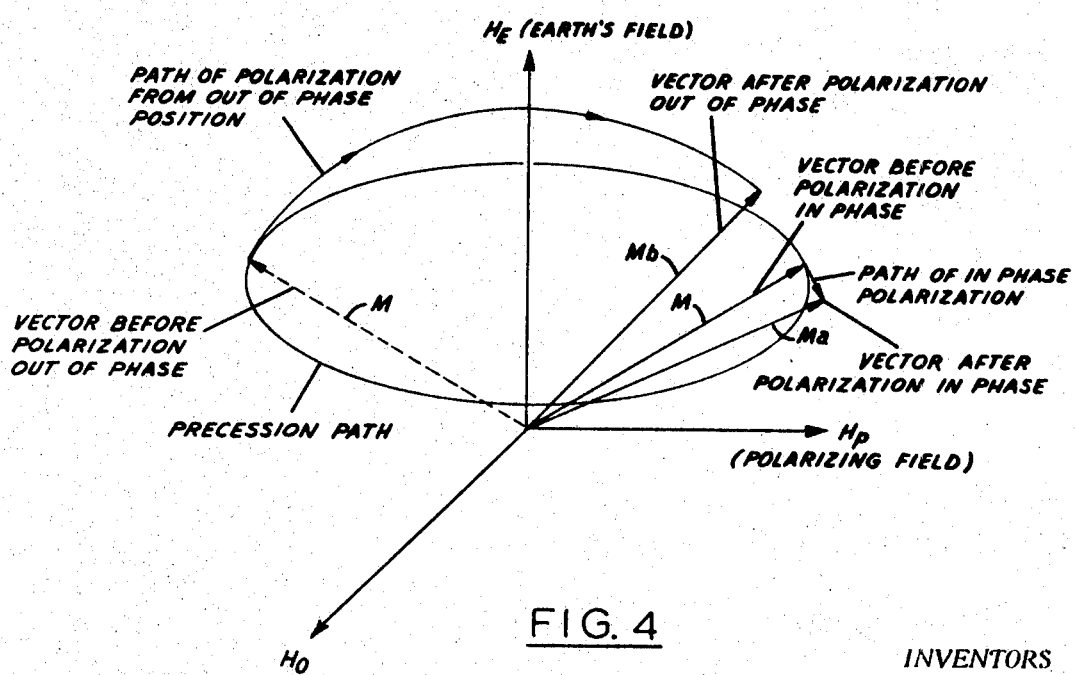
INVENTORS
ANTHONY RENE BARRINGER
VOLKER GRIMM
BY Rogers, Bereskin, & Parr INVENTORS
ANTHONY RENE BARRINGER
VOLKER GRIMM
BY Rogers, Bereskin, & Parr

United States Patent Office 3,546,574
Patented Dec. 8, 1970

3,546,574
PROTON PRECESSION MAGNETOMETER WITH SYNCHRONOUS PUMPING
Anthony Rene Barringer, Willowdale, Ontario, and Volker Grimm, Weston, Ontario, Canada, assignors to Barringer Research Limited, Rexdale, Ontario, Canada, a corporation
Filed Mar. 2, 1967, Ser. No. 620,106
Claims priority, application Great Britain, Mar. 12, 1966, 10,964/66
Int. Cl. G01r 33/08
U.S. Cl. 324—.5
1 Claim

ABSTRACT OF THE DISCLOSURE

A proton precession magnetometer wherein the polarizing field is carefully timed so that it is applied at an instant when the magnetic moment of the freely precessing protons is substantially aligned with the polarizing field. Repeated applications of the polarizing field causes the precession signals to build or pump up to a level considerably greater than the level after the initial application of the polarizing field.

---

Figure 5:
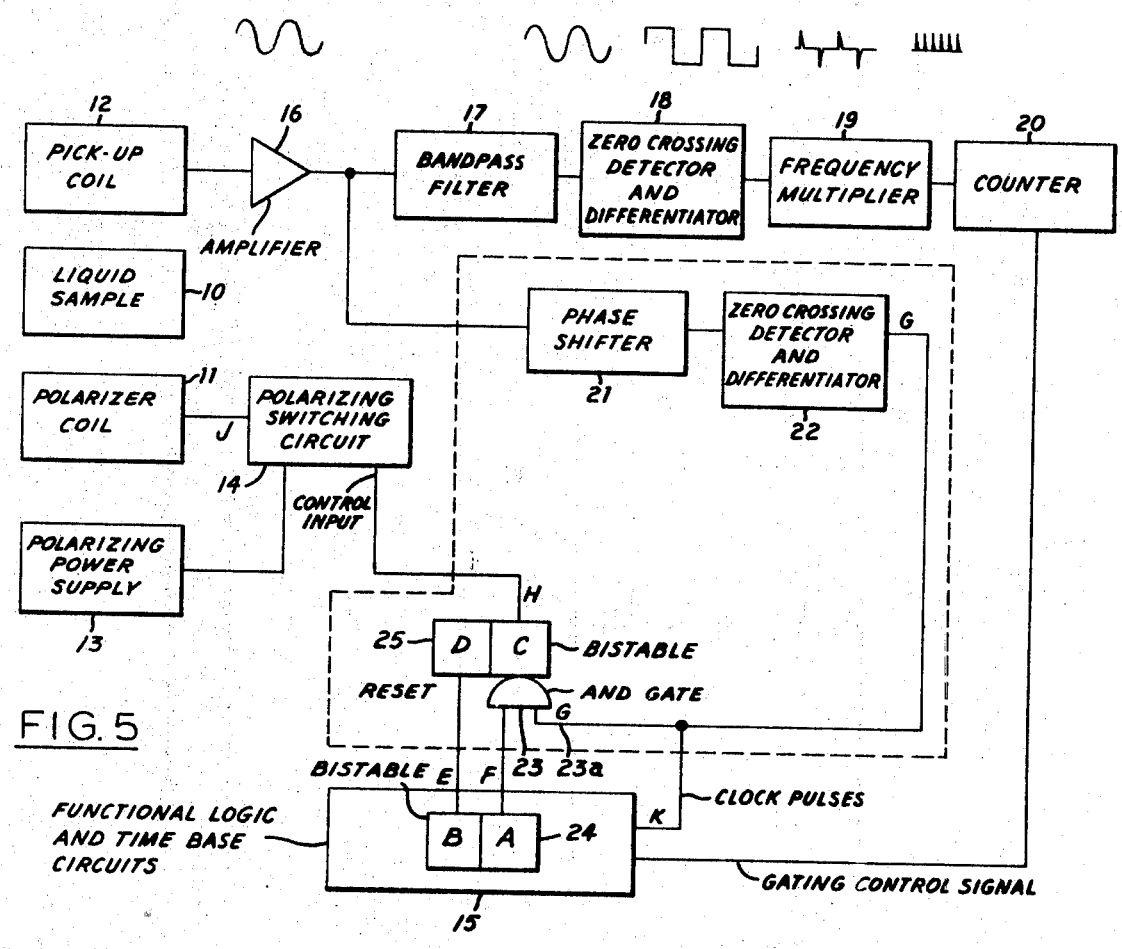

This invention relates to the measurement of the strength of magnetic fields and in particular to an improved proton precession magnetometer.

Proton precession magnetometers are used for measuring the strength of magnetic fields, such as the earth's magnetic field. In a magnetometer of this kind the protons contained in a sample of a proton rich liquid are polarized by means of a magnetic field produced by the flow of current in a coil surrounding the sample. When the coil is energized with pulses of direct current (polarizing pulses) the protons are polarized in the direction of the polarizing field produced by the coil, and when the coil is deenergized the protons precess freely at their Larmour frequency about an axis parallel to the earth's magnetic field. The polarizing field always forms an angle (preferably 90°) with the earth's magnetic field. The freely precessing protons possess a magnetic moment (a vector quantity) which rotates about an axis parallel with the direction of the earth's magnetic field. During periods of free precession, decaying audio frequency precession signals are induced in the coil, and the frequency of the precession signals is directly proportional to the strength of the earth's magnetic field. Several magnetometers of this type are adapted to give a direct read-out of the strength of the earth's magnetic field (e.g., in gammas) by counting the number of cycles of the free precession signals for a predetermined time.

Conventional magnetometers are generally programmed as follows. First, the protons are polarized for a predetermined interval. Second, the polarizing field is extinguished and a short period of time (wait period) is permitted to pass to permit the energy stored in the polarizing coil to dissipate. Third, the cycles of the precession signals are counted for a carefully measured time. Usually, the counting time is such that the number of cycles counted is equal to the strength of the magnetic field in gammas. The reader is referred to U.S. Pat. No. 3,098,197 of A. R. Barringer and Sholly Kagan dated July 16, 1963, for a description of a proton precession magnetometer of this kind.

The level of the precession signals depends, inter alia, on the length of time the polarizing field is applied. There is a limit to the amount of energy the protons can absorb, and this limit is approached in a manner akin to the charging of a capacitor. Thus it is common to refer to the relaxation time constant of the liquid containing the protons. The protons are said to be "saturated" when continued application of the polarizing field does not result in greater levels of the precession signals. In order to achieve strong precession signals, it was previously considered necessary to polarize the protons for a minimum of two polarizing time constants. The longer the polarizing period, however, the fewer the number of readings that can be made per minute. In addition, the accuracy of measurement depends upon the number of cycles of the precession signals that are counted. These factors tend to work against one another. Thus a long counting period is achieved at the expense of reading frequency, and high reading frequency is achieved at the expense of the counting period and polarizing time. It is apparent, therefore, that if the polarizing time can be substantially reduced while still obtaining precession signals of usable levels, either the reading frequency or the counting period or both can be increased. This is accomplished by the present invention in the following manner. Instead of applying the polarizing field at times that are more or less random in relation to the direction of the rotating magnetic moment of the freely precessing protons, in the present invention the polarizing field is applied at times when the magnetic moment of the protons is aligned, or at least approximately aligned with the polarizing field. When this is done it has been found that the precession signals unexpectedly build or pump up to a level that is considerably higher than if the polarizing field was initiated at times other than the optimum.

Figure 6:
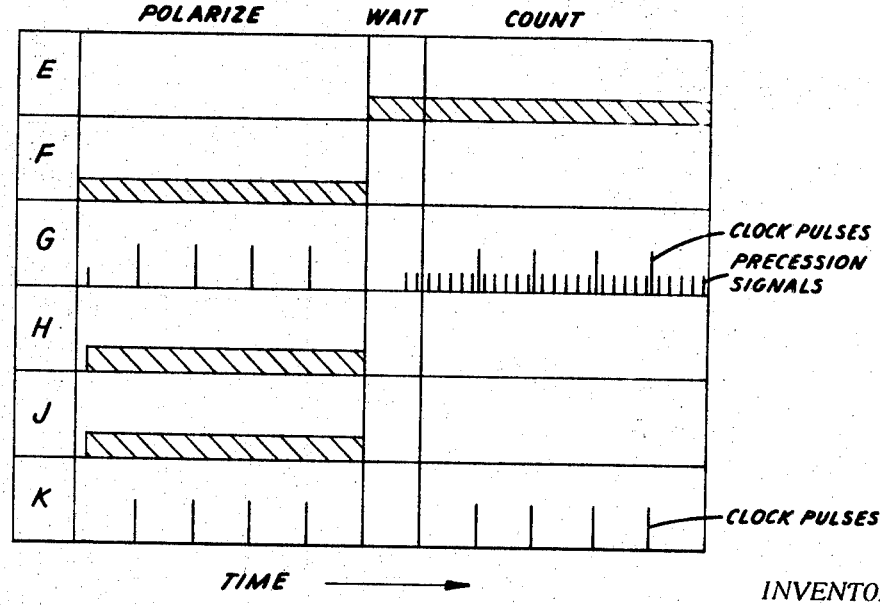

The invention is illustrated by way of example in the accompanying drawings, wherein:

FIG. 1 is a graph showing a series of polarizing pulses,

FIG. 2 is a graph showing a series of precession pulses building or pumping up to a maximum level, FIG. 3 is a graph showing a series of precession pulses decaying from a maximum level to a lower level, FIG. 4 is a graph showing magnetic moment vectors for in phase and out of phase polarization conditions, FIG. 5 is a block diagram of a preferred form of a magnetometer utilizing the method of pumping up the precession signals in accordance with the invention, and FIG. 6 is a graph illustrating the timing of various events in the operation of the magnetometer of FIG. 5.

Referring to the drawings, FIG. 1 shows a series of polarizing pulses which are used for energizing a conventional coil for polarizing protons in a liquid sample. The polarizing pulses form a pulsating polarizing field that is preferably at right angles to the earth's magnetic field. FIG. 2 shows a series of precession pulses which are induced in the coil during intervals between successive polarizing pulses. The free precession pulses of FIG. 2 build or pump up to a maximum level as a result of adjusting the start of each polarizing pulse to an optimum time, as will be explained. When the start of each polarizing pulse no longer occurs at the optimum time, the pumped precession signal may decay from a maximum level to a lower level, as shown in FIG. 3.

Referring to FIG. 4, $H_E$ represents an axis that is parallel to the earth's magnetic field, $H_P$ represents an axis that is parallel to the polarizing field, and $H_O$ represents an axis that is perpendicular to both the $H_E$ and $H_P$ axes. When the coil is energized (i.e., when a polarizing pulse is flowing through it) the magnetic moment or macroscopic magnetization of the protons (represented by vector M) precesses about the $H_P$ axis at a frequency $\omega_P = \gamma H_P$, where $\gamma$ is the gyromagnetic ratio. Since the polarizing field is much stronger than the earth's field, the vector M tends to become aligned with the polarizing field. When the polarizing field is extinguished, the vector M spirals towards alignment with the $H_E$ axis as it precesses about it. Now if the vector M happens to be to the right of the $H_E H_O$ plane (as viewed in FIG. 4) at the start of the next polarizing pulse, a component of the vector M will be in phase with the polarizing field and thus will add to the polarizing field. If the vector M is in the solid line position shown in FIG. 4, where it is the $H_EH_P$ plane, the component of the vector M that is in phase with the polarizing field is a maximum. Vector Ma represents the magnetic moment at the end of the said next polarizing pulse, and it is apparent that the amplitude of the magnetic moment has increased. Conversely, if the vector M happens to be to the left of the $H_EH_O$ plane at the start of the said next polarizing pulse, the vector M will be out of phase with the polarizing field. The dotted line position of the vector M shown in FIG. 4 represents the maximum out of phase position of the vector M. If the said next polarizing pulse starts when the vector M is in the dotted line position the out of phase component of the vector M subtracts from the polarizing field and the resulting vector Mb represents a lower level of magnetization than the vector Ma. The former condition is therefore desirable; the latter is not.

By properly synchronizing the polarizing pulses so that they start when the magnetic moment is in phase with the polarizating field (i.e., solid line position of vector M, FIG. 4) or substantially in phase, it has been found that the precession signals pump up to a maximum equilibrium level that is maintained as long as the syncronization is correct. Changes in the strength of the earth's magnetic field cause changes in the precession frequency, so the timing of the polarizing pulses must be adjusted in accordance with changes in the strength of the earth's field.

It is preferred that the liquid have a relatively long relaxation time constant (defined below) so that the precession signal decays slowly between successive pulses. Deoxygenated benzene is a suitable liquid.

A mathematical explanation of the pumping method according to the invention is explained as follows. It is assumed that a polarizing field of constant amplitude $H_P$ which is large compared with the earth's field $H_E$ causes the magnetic moment to grow towards an equilibrium value $M_O = X_O H_P$ with a characteristic relaxation time constant $\tau$. The relaxation time constant is the time taken for the level of the precession signals to drop to $i/e$ or 36.8% of the initial value. $X_O$ is a proportionality constant. The direction of magnetic moment is that of $H_P$ and is perpendicular to $H_E$. If the polarizing field consists of polarizing pulses instead of a constant direct current field, the amplitude of the magnetic moment at the end of each polarizing pulse will in general be less than $M_O$. During the time between polarizing pulses the magnetic moment precesses about $H_E$ at a frequency $\omega_E = \gamma H_E$, during the polarizing pulse the magnetic moment precesses about $H_P$ at a frequency $\omega_P = \gamma H_P$. All relevant relaxation times are assumed to be the same ($\tau$), and field inhomogeneities in the liquid are neglected.

During the first polarizing pulse the magnetization grows to:

$$M_P(1) = M_O(1 - \exp(-t_W/\tau))$$

where $t_w$ is the duration of the polarizing pulse.

When the polarizing field is extinguished (off period) the magnetic moment decays to $$\beta M_P(1) = M_P(1) \exp(-t_o/\tau)$$

where $t_o$ is the duration of the off period.

CASE 1

During the off period $M_P(1)$ precesses about $H_E$ at frequency $\omega_E$. In this case it is assumed that when $H_P$ is turned on again $\beta M_P(1)$ is in the direction of $H_P$. This represents the maximum in phase position which gives maximum pumping effect. Then following the second pulse, $$M_P(2) = M_0 \left[1 - \left(1 - \frac{\beta M_P(1)}{M_0}\right) \exp(-t_W/\tau)\right]$$

Similarly, following the $n$th pulse $$M_P(n) = M_0 \left[1 - \left(1 - \frac{\beta M_P(n-1)}{M_0}\right) \exp(-t_W/\tau)\right]$$

if $M_P(n)$ is written as $\alpha_n M_O$ it follows that $$\alpha_{n+1} = 1 - \frac{(1 - \beta \alpha_n)(1 - \alpha_n)}{1 - \beta \alpha_{n-1}}$$

Numerical results have been obtained for $t_w = 0.1\tau$ and $0.2\tau$ which approximate experimental values of $t_w \sim \frac{1}{4}$ second, $t_o \sim \frac{1}{2}$ second, $\tau \sim 3$ sec. The results appear in the following table, from which it appears that the amplitude of the magnetic moment approaches an equilibrium limit that is about one third of the level of the equilibrium value $M_O$.

| $n$ | $\alpha_n$ | $\alpha_n - \alpha_{n-1}$ |
|---|---|---|
| 1 | .095 | |
| 2 | .165 | .070 |
| 3 | .217 | .052 |
| 4 | .256 | .039 |
| 5 | .284 | .028 |
| 6 | .304 | .020 |
| 7 | .318 | .014 |
| 8 | .330 | .012 |
| 9 | .337 | .007 |
| 10 | .342 | .005 |

CASE 2

This is the more general case. It is assumed that when $H_P$ is turned on for the second time (i.e., during the second polarizing pulse), $\beta M_P(1)$ makes an angle $\theta$ with $H_P$ in the plane perpendicular to $H_E$ (hereafter referred to as the $P \perp$ plane). During the second polarizing pulse the magnetic moment lies in the $P \perp$ plane, then $$M_P(2) = M_0 \left\{1 - \left[1 - \frac{\beta M_P(1) \cos \theta_1}{M_0}\right] \exp(-t_w/\tau)\right\}$$

$$M_\perp(2) = \beta M_0 \exp(-t_w/\tau) M_P(1) \sin \theta_1$$

The observed free precession decay following the second pulse is proportional to $M(2)$ where $$M(2) = [M_P^2(2) + M_\perp^2(2)]^{1/2}$$

During the off period these components decay to $$\beta M_P(2) \text{ and } \beta M_\perp(2)$$

respectively. Just before the third pulse the magnetization makes an angle $\theta_2$ with the direction of $H_P$ where:

$$\theta_2 = \theta_1 + \tan^{-1}[M_\perp(2)/M_P(2)]$$

In a similar way, $$M_P(n) = M_0 \left\{1 - \left[1 - \frac{\beta M(n-1) \cos \theta_{n-1}}{M_0}\right] \exp(-t_w/\tau)\right\}$$

$$M_\perp(n) = \beta M_0 \exp(-t_w/\tau) M(n-1) \sin \theta_{n-1}$$

where $$\theta_n = \theta_{n-1} + \tan^{-1}[M_\perp(n)/M_P(n)]$$

The free precession decay following the $n$th pulse is proportional to $M(n)$ where $$M(n) = [M_P^2(n) + M_\perp^2(n)]^{1/2} = \alpha_n M_0$$

Numerical results have been obtained for $t_w = .1\tau$, $.2\tau$, and $\theta = 15°$ and $25°$. These results appear in the following table, from which it appears that the level of the magnetic moment decreases with increasing $\theta$ after the first polarizing pulse.

$\theta = 15°$

| $n$ | $\alpha_n$ | $M_P(n)/M_0$ | $M_\perp(n)/M_0$ | $\theta_{n-1}$ |
|---|---|---|---|---|
| 1 | .095 | .095 | 0 | 0 |
| 2 | .164 | .163 | .018 | 15° |
| 3 | .212 | .208 | .044 | 21°24' |
| 4 | .245 | .235 | .071 | 27° |
| 5 | .267 | .249 | .095 | 31°54' |
| 6 | .280 | .255 | .117 | 36°6' |
| 7 | .287 | .255 | .132 | 39°36' |
| 8 | .290 | .252 | .143 | 42°24' |
| 9 | .290 | .248 | .151 | 44°30' |
| 10 | .289 | .244 | .155 | 46°18' |

$\theta = 25°$

| $n$ | $\alpha_n$ | $M_P(n)/M_0$ | $M_\perp(n)/M_0$ | $\theta_{n-1}$ |
|---|---|---|---|---|
| 1 | .095 | .095 | 0 | 0 |
| 2 | .161 | .158 | .030 | 25° |
| 3 | .204 | .192 | .070 | 35°42' |
| 4 | .228 | .202 | .107 | 45° |
| 5 | .239 | .197 | .135 | 52°54' |
| 6 | .240 | .185 | .153 | 59°24' |
| 7 | .235 | .172 | .161 | 64°30' |
| 8 | .228 | .161 | .161 | 68° |
| 9 | .221 | .153 | .159 | 70° |
| 10 | .215 | .148 | .156 | 71°6' |

From the above, it appears that when the spacing between polarizing pulses is adjusted so that $\theta = 0$ condition obtains (optimum synchronization), then the precession signal after a number of polarizing pulses builds to about three times the level after a single polarizing pulse. This represents a considerable increase in signal strength.

Referring to FIG. 5, the broken lines separate conventional elements of a typical proton precession magnetometer (shown outside the broken lines) from elements which are used in the present invention. The conventional parts will first be described briefly. A sample 10 of a proton rich liquid such as deoxygenated benzene is surrounded by a polarizer coil 11 and a pickup coil 12 (occasionally these are a single coil). Direct current power for the polarizing field is supplied by a power supply 13 which is intermittently connected to the polarizer coil 11 by a controllable switching circuit 14. The direction of the polarizing field produced by the coil 11 is parallel to the axis of the coil 11, as is well known in the art. The switching circuit 14 is controlled by functional logic and time base circuits 15, the purpose of said circuits being to provide signals for controlling the initiation and duration of various events in the operation of the magnetometer, such as the polarizing period, the wait period and the count period. The precession signals are induced in the pick-up coil 12 and are amplified by an amplifier 16 of very low phase shift. The amplifier 16 is either gated off during the polarizing period or else the pickup coil 12 is decoupled from the polarizer coil 11. The output of the amplifier 16 consists of a fairly noisy A.C. audio voltage of the Larmaus frequency of the precessing protons. The quality of this voltage is improved by feeding it through a band pass filter 17 which rejects much of the noise. The output of the band pass filter 17 is fed to a zero crossing detector and differentiator circuit 18, the output of which consists of narrow pulses of the same frequency as the Larmour frequency. These last mentioned pulses are fed to a frequency multiplier 19 and the output of the frequency multiplier 19 is fed to a counter 20. The counter 20 is controlled or gated by the functional logic and time base circuits 15 so that pulses appearing at the output of the multiplier 19 are counted for a predetermined interval during the counting period.

Referring now to the portion of the block diagram enclosed by the broken lines in FIG. 5, the output of the amplifier 16 is fed to a phase shifter 21 which changes the phase of the amplified precession signals by a constant angle $\alpha$ which can be varied initially to optimize the pumping effect, as will be explained. The phase shifted output of the phase shifter 21 is fed to a zero crossing detector and differentiator 22 which produces narrow positive and negative pulses at times corresponding to zero crossings of the precession signals. These pulses are fed to input 23a of an "and" gate 23. Clock pulses (e.g., fast rise time, evenly and accurately spaced pulses) produced by a crystal oscillator in the functional logic and time base circuits 15 are also fed to the input 23a of the "and" gate 23. The other input of the "and" gate 23 is connected to stage A of a bistable multivibrator 24 which is included in the functional logic and time base circuits 15. The output of the "and" gate 23 is fed to stage C of a bistable multivibrator 25. Stage B of the bistable multivibrator 24 is connected to stage D of the bistable multivibrator 25. Stage C of the bistable multivibrator 25 is connected to one input of the switching circuit 14.

The operation of the magnetometer will now be described with reference to FIGS. 5 and 6. It will be assumed that the magnetometer is in operation, and that the sequence of events is (1) polarize period, (2) wait period and (3) count period, these events being repeated continuously and being programmed by the functional logic and time base circuits 15. The clock pulses referred to above are used to fix the durations of these events as well as the times they commence. The clock pulses are shown diagrammatically at K, and it will be noted that the duration of the polarize period in the example of FIG. 6 is equivalent to five clock pulses, the wait period one clock pulse and the count period five clock pulses. It will be understood that this distribution of time is by way of example only. Assuming that the magnetometer is in the middle of the polarize period, stage C of the multivibrator 25 is on (i.e., its output=1) and it provides a control signal for the switching circuit 14 thereby connecting the power supply 13 with the polarizer coil 11. Thus the protons in the sample 10 are being polarized. At the start of the wait period, stage B of the multivibrator 24 turns on and stage A turns off (output=0). This causes stage C of the multivibrator 25 to turn off, thereby opening the switching circuit 14 and extinguishing the polarizing field. Towards the end of the wait period, as conditions begin to stabilize, precession signals begin to appear at input 23a of the "and" gate 23 (see G). The clock pulses also appear at the same input. The multivibrators 24 and 25, respectively, remain in the above conditions during both the wait and count periods. Additional circuitry is provided in the functional logic and time base circuits 15 for starting and stopping the counter 20. At the start of the polarize period, stage B of the multivibrator 24 turns off and stage A turns on. The output of the "and" gate 23 remains off, however, until a pulse is received at the input 23a. When such pulse is received, the output of the "and" gate causes stage C of the multivibrator 25 to turn on and a control signal is thereby fed to the switching circuit 14 so that current is fed to the coil 11.

Due to the fact that a finite time is required for the polarizing field to build up to the required level for polarization, it is desirable to activate the switching circuit 14 slightly in advance of the time when the magnetic moment of the protons is aligned with the axis of the coil 11 and the direction of the polarizing field so that the polarizing field has built up to close to its equilibrium level by the time the magnetic moment is lined up with it. This advance timing is provided by the phase shifter 21. In practice the phase shift angle $\alpha$ is adjusted until the level of the precession signals is observed to build up to a maximum level. After the initial adjustment, the angle $\alpha$ need not be varied, unless the frequency of the precession signals changes appreciably (i.e., by more than about 20% or so).

Thus, in FIG. 6 under the heading "Polarize" one timing pulse as well as several clock pulses are observed at G. Before the and gate 23 can produce an output, not only must stage A of the multivibrator 24 be turned on, but a signal must appear at input 23a. The first signal to appear at input 23a is a timing pulse, and as shown at H and J the switching circuit 14 closes at this point and current begins to flow through the coil 11. The reason for applying the clock pulses to the input 23a is solely to permit the apparatus to commence cycling (i.e., the initial polarizing period begins at a clock pulse, and thereafter it begins at times determined by the phase of the timing signals at G. Stage A of the multivibrator 24 should be delayed sufficiently so that it turns on immediately after a clock pulse has died down.

It will be understood that the invention is also applicable to other spin systems possessing angular momentum and a magnetic moment.

What is claimed is:

1. A proton precession magnetometer for measuring the strength of a first magnetic field, said magnetometer including a sample of a proton rich liquid, a coil surrounding the sample, said coil having an axis positioned at an angle to said first magnetic field, means for intermittently supplying current pulses of uniform duration to the coil to produce a second magnetic field of predetermined direction which polarizes protons in the sample in a direction parallel to said coil axis, the duration of said current pulses being greater than one Larmour period and said duration being sufficient to produce observable precession signals, means for receiving precession signals produced by the protons as they freely precess about said first magnetic field during intervals between said current pulses, means for measuring the frequency of said precession signals, said protons possessing angular momentum and a magnetic moment which rotates about said first magnetic field during periods of free precession, means for initiating said current pulses, subsequent to the initial current pulse, at times when the magnetic moment of said protons is substantially aligned with said coil axis and with said predetermined direction of said second magnetic field, said current initiating means comprising means for adjustably shifting the phase of the precession signals by an angle to produce a phase shifted voltage, means responsive to zero crossing positions of said phase shifted voltage for producing a repetition of timing signals, and switch means controlled by said timing signals for supplying current to said coil at times when the magnetic moment of said protons is substantially aligned with said coil axis and with said predetermined direction of said second magnetic field; and said apparatus further including means for periodically generating a control signal at a first output and a reset signal at a second output, a bistable multivibrator having first and second inputs and an output connected to said switch means, and an "and" gate having first and second inputs and an output that is connected to the first input of said bistable multivibrator, said first input of said "and" gate being connected to said timing signal producing means, said second input of said "and" gate being connected to the first output of said control signal generating means, said "and" gate providing a trigger signal for flipping said bistable multivibrator into one of its stable states with a switching signal appearing at its output when said control signal and one of said timing signals contemporaneously appear at said first and second inputs of said "and" gate, said switch means being activated by said switching signal, the second input of said multivibrator being connected to the second output of said control signal generating means whereby said multivibrator is periodically reset.

References Cited
UNITED STATES PATENTS

| | | | |
|---|---|---|---|
| 3,090,002 | 5/1963 | Allen | 324—0.5 |
| 3,098,197 | 7/1963 | Barringer | 324—0.5 |
| 3,133,243 | 5/1964 | Bonnet | 324—0.5 |
| 3,256,477 | 6/1966 | Gautier | 324—0.5 |
| 3,371,270 | 2/1968 | Rochet | 324—0.5 |
| 3,443,207 | 5/1969 | Feild | 324—0.5 |

RUDOLPH V. ROLINEC, Primary Examiner

M. J. LYNCH, Assistant Examiner